United States Patent [19]
Kennedy

[11] Patent Number: 5,839,558
[45] Date of Patent: Nov. 24, 1998

[54] VISCOUS FAN CLUTCH WITH ENGAGE PORT LOCK

[75] Inventor: Lawrence Craig Kennedy, Kettering, Ohio

[73] Assignee: General Motors Corporation, Detroit, Mich.

[21] Appl. No.: 882,476

[22] Filed: Jun. 25, 1997

[51] Int. Cl.[6] ................................................. F16D 35/02
[52] U.S. Cl. ................................ 192/58.62; 192/58.682; 192/58.8; 192/82 T
[58] Field of Search ............................... 192/58.5, 28.62, 192/58.63, 58.68, 58.681, 58.682, 58.8, 82 T, 103 FA, 114

[56] References Cited

U.S. PATENT DOCUMENTS

| | | | |
|---|---|---|---|
| 3,690,428 | 9/1972 | LaFlame | 192/58 B |
| 4,570,771 | 2/1986 | Yamaguchi et al. | 192/58.62 |
| 4,574,929 | 3/1986 | Hayashi et al. | 192/58.62 |
| 4,960,191 | 10/1990 | Lambert et al. | 192/58.8 X |
| 5,119,921 | 6/1992 | Drennen et al. | 192/58 B |

*Primary Examiner*—Richard M. Lorence
*Attorney, Agent, or Firm*—Jeffrey A. Sedlar

[57] ABSTRACT

A clutch includes an input shaft with a clutch plate engaged with the input shaft to rotate in concert therewith. The clutch plate has an annular disk portion with a clutch plate set of lands and grooves. A housing includes a body supported on the input shaft by a bearing with a body set of lands and grooves mating with the clutch plate set of lands and grooves. A cover is included as part of the housing and engages with the body. A pump plate is captured between the cover and the body separating out a working chamber. The pump plate includes an engage port and a pump-out port positioned further radially outward in the pump plate than the engage port. A control arm normally closes the engage port and is rotatable to open the engage port. A slide-block is carried in a pocket of the cover with a spring biasing the slide-block toward engagement with the control arm. The slide-block locks the control arm against rotation when the clutch is inactive.

8 Claims, 1 Drawing Sheet

VISCOUS FAN CLUTCH WITH ENGAGE PORT LOCK

TECHNICAL FIELD

The present invention relates to a viscous fan clutch and more particularly, to a viscous fluid fan drive clutch with an engage port lock to securely seal the engage port during clutch inactivity.

BACKGROUND OF THE INVENTION

Fan clutches operating on viscous fluid torque transfer principles conventionally consist of a driving clutch plate coaxially mounted on a drive shaft that is driven at engine speed or some selected proportion thereof. A driven clutch body having a central bearing is generally coaxially located on the same drive shaft as the clutch plate to rotate at some range of speeds, effecting slip-speeds between the clutch body and the clutch plate. Both the clutch plate and the clutch body display intermeshing lands and grooves that act to transfer forces as the drive surfaces of the clutch. The space between the grooves is filled with a viscous fluid such as silicone that transfers drive torque from the clutch plate to the clutch body.

A pump plate typically separates the interior of the clutch body into two chambers including a working chamber containing the drive surfaces and a reservoir chamber. A combination of raised diverters formed into or fastened onto the pump plate, and holes in the plump plate itself, form a pumping mechanism which uses the relative motion of the face of the clutch plate to force fluid out of the working chamber containing the drive surfaces, and into the reservoir chamber. This action removes the viscous fluid from the space between the drive surfaces, thereby reducing the driving torque transfer effected in the clutch.

A temperature responsive actuator is generally located on the face of a cover that seals the clutch mechanism. When subjected to temperatures higher than a preselected calibration temperature of the clutch, the actuator opens an engage port formed into the pump plate and permits the fluid contained in the reservoir chamber of the clutch to flow back into the working chamber. Once in the working chamber, centrifugal force causes the fluid to flow into the space between the drive surfaces, thereby restoring drive torque. The clutch pump and engage port are sized so that when the valve is open, it returns fluid to the working chamber faster than the pump can remove it to the reservoir chamber, so that substantially all of the fluid carried by the clutch remains in the working chamber when the clutch is engaged.

When the clutch is operating under high engine cooling requirements, the temperature responsive actuator maintains an open engage port condition. When the associated vehicle is parked and the engine turned off under this situation, the engage port is initially closed but can reopen under elevating temperatures in the engine compartment. Additionally, when the engine is stopped when the engage port of the clutch is closed, elevating engine compartment temperatures can effect an opening of the engage port. This allows fluid to leak into the working chamber of the clutch, resulting in an engaged condition when the vehicle is restarted. It has been found to be undesirable to start a vehicle with the fan clutch engaged since a corresponding elevated noise level occurs as the fan is rapidly accelerated with the engine. Accordingly, it would be desirable to avoid an engaged condition of the fan clutch that results from hot engine stops.

SUMMARY OF THE INVENTION

An aspect of the present invention is to avoid fan noise during vehicle engine starts by preventing the leakage of fluid into the working chamber of a viscous fluid fan clutch after a hot engine stop. In fulfilling this aspect, the present invention incorporates a mechanism into the clutch to securely hold the engage port in a closed condition. This results in ensuring a disengaged fan clutch condition during the subsequent engine re-start.

More specifically, a clutch according to aspects of the present invention includes an input element with an engaged input shaft and clutch plate rotatable in concert. The clutch plate has an annular portion with a set of lands and grooves. A housing includes a body supported on the input shaft by a bearing with another set of lands and grooves mating with the clutch plate set of lands and grooves. A cover is included as part of the housing, engaging the body and defining a reservoir. A pump plate is captured between the cover and the body separating out a working chamber generally within the body. The pump plate includes an engage port and a pump-out port that is positioned further radially outward than the engage port. A control arm normally closes the engage port and is movable to open the engage port under elevated temperatures. When the engage port is closed, fluid carried in the working chamber moves radially outward under centrifugal force and is forced through the pump-out port due to relative rotation between the clutch plate and the pump plate so that the clutch is disengaged. A spring operated lock captures the control arm in a securely closed condition when the clutch is non-rotating preventing the leakage of fluid through the engage port.

DESCRIPTION OF THE PREFERRED EMBODIMENT

Figure 1:
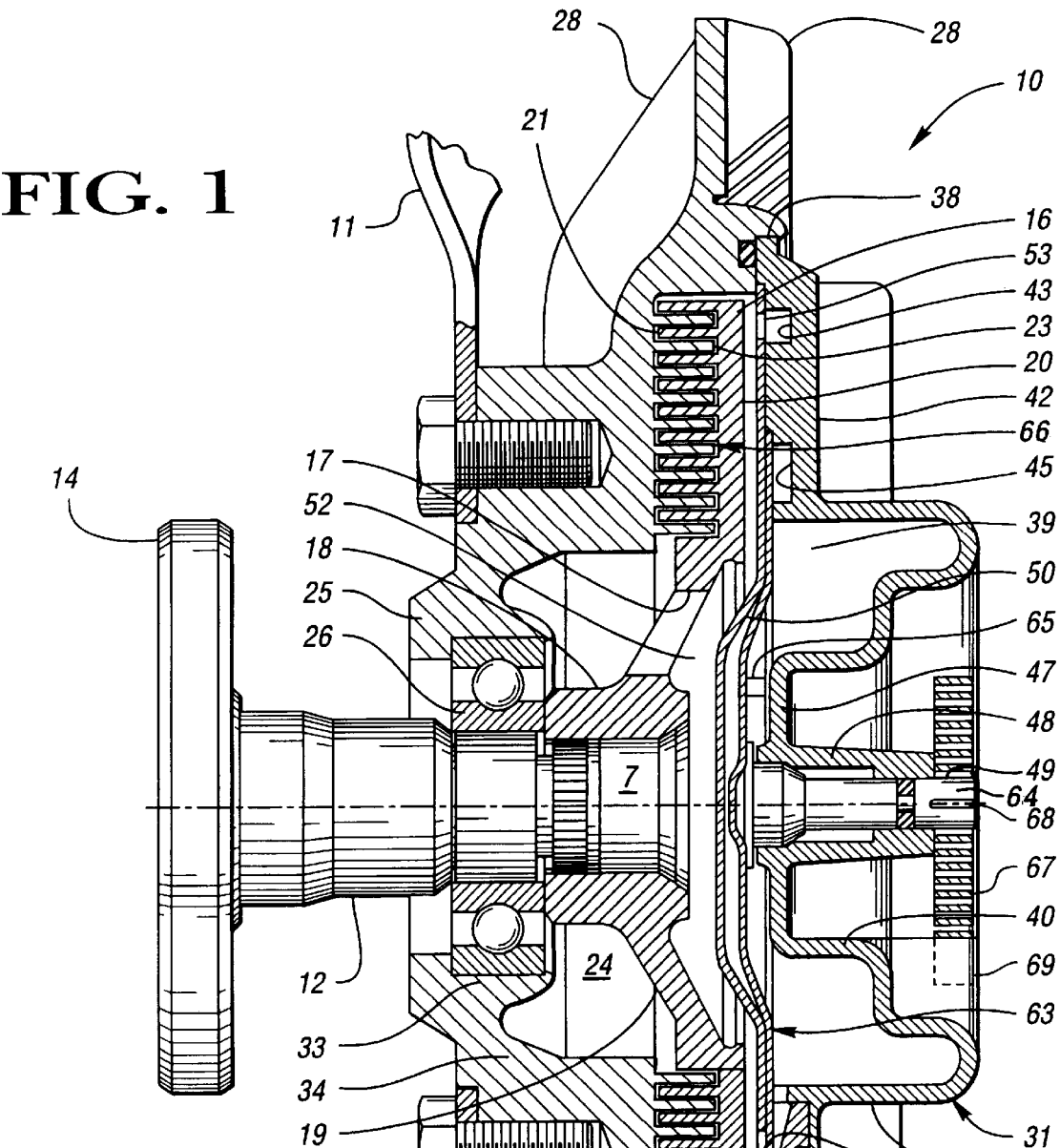
FIG. 1 is a cross sectional illustration of a viscous fluid fan clutch according to aspects of the present invention.

Referring to the drawings, FIG. 1 illustrates a viscous fluid clutch designated in the aggregate as 10. In general, the clutch 10 operates to transfer torque to a fan 11 using the shear characteristics of a contained viscous fluid. The clutch 10 includes a rotary driven input shaft 12 that is mounted to rotate at engine speed or some selected proportion thereof. The input shaft 12 is provided with a central shaft in a tapered configuration with multiple steps that terminate at one end with a flange 14 and another end 7. The flange 14 is adapted to be secured to an engine (not illustrated) in a known manner to drive the clutch 10.

A single clutch plate 16 operates as part of the input element and includes a central hub portion 18 and an annular disk portion 20 that are connected together by a set of integral, generally radially extending spokes 19 defined by a set of openings, representative of which is opening 17, that are evenly distributed in a circular pattern around the clutch plate 16. The clutch plate 16, and specifically the hub portion 18, is engaged with input shaft 12 about end 7 for concerted rotation therewith. Accordingly, when the input shaft 12 is driven by the engine, the clutch plate 16 rotates at the same speed. The spokes 19 support the annular disk portion 20 at a position that is radially spaced outward from the axis of the clutch. At this general radially outward position, the annular disk portion 20 presents a series of rearwardly facing axially directed lands 21 formed by a series of annular grooves 23 cut in the clutch plate 16.

Carried about the clutch plate 16 is shell-like housing 22 that defines an internal cavity 24 and includes a hub portion 25 rotatably mounted on the input shaft 12 by a bearing assembly 26. In a conventional manner, the housing 22 is provided with a plurality of fins 28 on its outer surface to dissipate heat transferred from a viscous fluid contained inside the clutch 10. A plurality of bosses 27 are formed on the exterior surface of the housing 22 and the fan 11 is attached by threaded fasteners to the bosses 27. Absent some means of transferring torque from the clutch plate 16 to the housing 22, the housing and the attached fan 11 are carried by the bearing assembly 26 in a generally nondriven manner.

The housing 22 includes a body 30 and a cover 31 that are formed separately and joined together around an annular step 29, with a seal 32 compressed in the joint to maintain the fluid in the cavity 24. Each of the body 30 and cover 31 are formed by casting a material such as aluminum and machining appropriate features in the casting. The body 30 includes an axially directed wall 33 that is engaged with the outer race of bearing assembly 26. Wall 33 is contiguous with an angled wall 34 that carries the bosses 27 and extends radially outward and forward generally at an angle relative to the axis of the clutch 10. Wall 34 includes a number of lands 35, that are formed by machining a series of annular grooves 36 in the body 30, and which extend parallel to the axis of the clutch 10 and forwardly into the cavity 24. The lands 35 mesh with the grooves 23 formed in the clutch plate 16, and the grooves 36 mesh with the lands 21 formed in the clutch plate 16 so that the clutch plate 16 and the body 30 mate together with a thin shear zone space maintained between the two components wherein the clutch plate 16 is freely rotatable within the housing 22.

Cover 31 has an annular outer edge 38 secured to the body 30 by an annular retainer lip spun over from the material at the outer periphery of the body 30. Within what has been generally defined as the cavity 24 formed by the housing 22, a fluid reservoir 39 is formed as an annular chamber in the interior surface of the cover 31 generally between axially extending annular walls 40 and 41. A radially directed annular wall 42 extends from the wall 41 to the outer edge 38. The annular wall 42 includes an internal chamber 43, that absent some means of closure, is open to the cavity 24. The chamber 43 is open to the reservoir 39 through a generally spiraling channel 45, as is generally known in the art. The wall 40 extends to an annular wall 47 that supports a generally cylindrical wall 48 that defines an axial opening 49 to the cavity 24.

A disk-like pump plate 50 is positioned between the body 30 and the cover 31 on an annular step 51 of the cover 31 and is fixed with the housing 22. The pump plate 50 separates out a working chamber 52 within the cavity 24 that is generally within the body 30. The fluid reservoir 39, chamber 43 and channel 45 are substantially separated from the working chamber 52 by the pump plate 50. Pump plate 50 includes at least one pump-out port 53. A known wiper (not shown), is associated with the pump-out port 53 so that when the pump plate rotates, a high pressure area is established on the working chamber side of pump-out port 53. An engage port 57 comprises an elongated opening and is positioned radially inside on the pump plate 50 from the pump-out port 53. The engage port 57 is positioned radially outboard from the reservoir wall 41.

A rotatable control arm indicated generally at 63, is positioned adjacent the pump plate 50 and is carried on the end of shaft 64. Preferably, the control arm 63 is a formed strip of spring steel. In the embodiment illustrated, the control arm 63 is a flexible, longitudinal member having a central portion with opposite extensions connected to the central portion by intermediate ramp portions to form a profile complementary to the pump plate 50. When assembled in the clutch 10, the control arm 63 contacts the front surface of pump plate 50 normally closing the pump-out port 53.

The shaft 64 is rotatably and sealingly positioned in axial opening 49 of cover 31. Rotational movement of the control arm 63 and shaft 64 is limited by one or more stops 65 formed in the inner surface of the cover 31. A bimetallic spiral coil 67 is mounted with one end 68 in a slot in the forward end of the shaft 64 and another end 69 grounded in the cover 31. Preferably, the bimetallic coil 67 is recessed within a cavity bounded by the annular raised portion of the cover 31. The bimetallic coil 67 responds to the ambient air temperature surrounding the cover 31. An increase in air temperature causes the coil 67 to expand, thereby rotating the shaft 64 and the control arm 63 to uncover the engage port 57 in the pump plate 50 when the temperature is above a certain predetermined level calling for additional air flow that is induced by the fan 11 to increase the cooling rate. When the air temperature has decreased, the bimetallic coil 67 contracts, causing the shaft 64 and control arm 63 to rotate back to their original positions, thereby covering the engage port 57 in the pump plate 50.

With the clutch 10 as thus far described, the clutch plate 16 will rotate with the input shaft 12, while the housing 22, pump plate 50 and fan 11 are substantially disengaged from such rotation through the bearing assembly 33. To provide a mechanism for engaging the housing 22 to rotate with the clutch plate 16 a fluid (not illustrated), such as silicone with a viscosity in the neighborhood of 9000 centistokes is carried in the cavity 24. Preferably, the fluid is of a type that is known in the art and is specifically developed for use in fan clutches. A fluid shear zone 66 is formed in the space between the clutch plate 16 and the housing 22 including the shear zone space between the lands 21 and grooves 23 of the clutch plate 16, and the lands 35 and grooves 36 of the body 30. Fluid sheared in the shear zone 66 transmits input torque from the rotatably driven clutch plate 16 to provide hydraulic drive of the housing 22 and the attached fan 11.

With the control arm 63 covering the engage port 57 very little fluid is maintained in the working chamber 52. The amount of slip between the clutch plate 16 and the housing 22 is determined by the amount of fluid in the working chamber 52. Accordingly, when the engage port 57 is closed, a large slip speed ratio exists wherein the clutch plate 16 rotates at the driven speed of the input shaft 12 and the housing 22 rotates at some slower speed. The relative rotation causes the fluid to be directed radially outward under centrifugal force in both the working chamber 52 and in the cover 31.

The relative speed between the clutch plate 16 and the pump plate 50 (which is attached to the housing 22), effects pumping action by creating a head of pressure about the inlet to the pump-out port 53. Hydraulic pressure causes fluid flow through the pump-out port 53 which is always open. With the engage port 57 closed, fluid is expelled from the working chamber 52 to a level that is at the radial outside of the pump-out port 53. At this fluid level in the working chamber 52, the amount of force transferred through shearing the remaining amount of fluid in the working chamber 52 effects a disengage speed for the housing 22.

To engage the clutch 10, fluid must be introduced into the working chamber at a rate faster than it is removed by the pump plate 50. Fluid flow to the shear zone 66 is controlled by the control arm 63. When the control arm 63 is rotated by a thermally induced response of the coil 67, the engage port 57 is opened. Fluid on the reservoir 39 side of pump plate 50 will move through the engage port 57 to the working chamber 52 under centrifugal force if the fluid is carried radially inward from the engage port 57. Accordingly, the reservoir 39 is provided to carry fluid and, since the cover 31 including the reservoir 39 is rotating rather slowly during disengagement, the engage port 57 is located in a radially outward location. This takes full advantage of the centrifugal force induced hydraulic pressure that is available, allowing the shear zone 66 to fill faster than the fluid is removed from the working chamber 52.

Since the fluid tends to be forced radially outwardly in both the working chamber 52 and in the cover 31, a mechanism must move the fluid from the chamber 43 to the reservoir 39. The hydraulic pressure effected on the working chamber side of pump-out port 53 provides such a mechanism by forcing the fluid through the pump-out ports 53, and through the chamber 43 and the channel 45, to the reservoir 39. The spiral shape of the channel 45 assists in moving the fluid inwardly by effecting a centripetal-like force through rotation of the cover 31. With the fluid contained in the reservoir 39, it readily moves into the working chamber 52 when the engage port 57 is open. Centrifugal forces of the rotating clutch 10 move the fluid into a radially directed flow between the pump plate and the clutch plate 16, and cause the fluid to be dispersed radially outwardly throughout the shear zone 66. Fluid friction in the shear zone 66 transmits the rotation of the clutch plate 16 to the housing 22. As the housing 22 rotates, the attached fan 11 is rotated to draw cooling air through a radiator (not illustrated) and assist in cooling an internal combustion engine in a well-known manner.

When the engine is off, the clutch 10 is non-rotating, and therefore, the fluid in cavity 24 will tend to settle under the operation of gravity. When the ambient temperature is below a set level, the bi-metallic coil places the control arm 63 in position to close the engage port 57 maintaining most of the fluid in the reservoir 39. If the engage port 57 is positioned at a low point relative to the axis of the clutch 10, and the engage port becomes open due to a high temperature level in the engine compartment of the associated vehicle, fluid can move into the working chamber 52 through the engage port 57. This condition is disadvantageous, since starting the vehicle's engine with the clutch 10 engaged, rapidly accelerates the fan 11 to driven speed resulting in noise. Accordingly, the present embodiment includes a mechanism for ensuring that the engage port 57 is closed.

Figure 2:
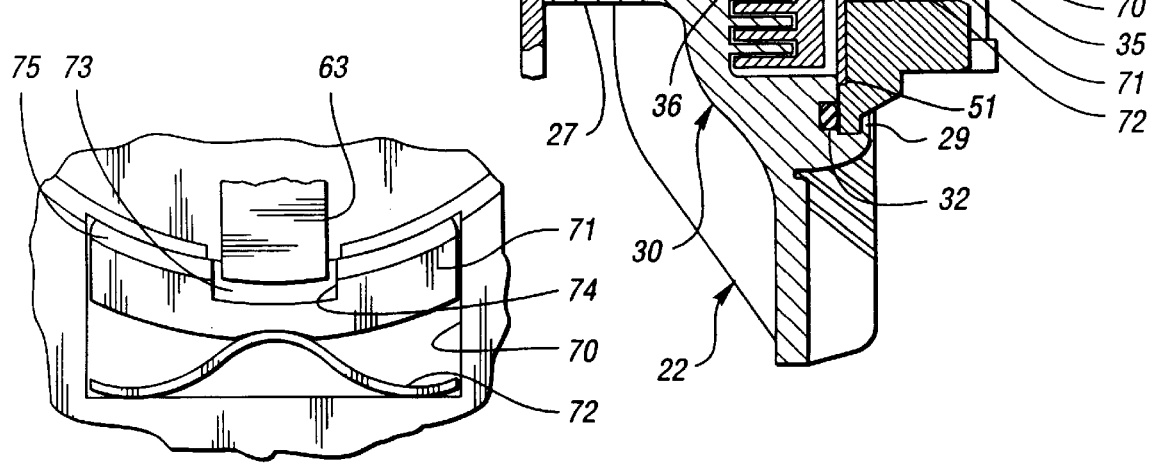
FIG. 2 is a detail illustration of a control arm lock utilized in the viscous fluid fan clutch of FIG. 1.

A pocket 70 is formed in the cover 31 and is in open fluid communication with the reservoir 39. Pocket 70 contains a lock effecting slide-block 71 that is biased radially inwardly by a bias spring 72. When the associated vehicle engine is off, the spring 72 forces slide-block 71 radially inwardly against wall 41 with ramped surface 73 biasing control arm 63 against valve plate 50 and locking closed engage port 57. As seen in FIG. 2, slide-block 71 includes a notch 74 that prevents rotation of the control arm 63 when the slide-block 71 is moved radially inward as shown in FIG. 1.

In the position of FIG. 2, the slide-block 71 is thrust radially outwardly, compressing spring 72 under centrifugal force during rotation of the clutch 10 when the associated vehicle engine is running at idle speed or above. Slide-block 71 is approximately one ounce in weight in the present embodiment. The slide-block 71 includes a beveled surface 75 that provides clearance permitting rotation of the control arm 63 under operation of the bimetallic coil 67 when the slide-block 71 is in the position of FIG. 2. Should the engine be turned off when the control arm has moved radially to expose the engage port 57, with ceasing rotation, the slide-block 71 is urged radially inwardly under the force of spring 72. In accommodation, the control arm 63 rides along the beveled edge 75 under operation of the bimetallic coil 67 until the control arm snaps into the notch 74, and the slide-block 71 moves against the wall 41.

The present invention provides a substantially leak free closure of the engage port 57 even after a hot stop of the associated engine. As a result, fluid is substantially prevented from entering the working chamber 52 from the reservoir 39 during dormant periods of the clutch 10. The slide-block 71 also advantageously provides more secure sealing of the engage port 57 by minimizing leakage during all inactive periods of the clutch 10. Accordingly, engine re-starts are enabled without the effects of engaged clutch acceleration noise.

I claim:

1. A clutch comprising:
   an input element including an input shaft with a clutch plate engaged with the input shaft to rotate in concert therewith, the clutch plate having an annular disk portion with a clutch plate set of lands and grooves;
   a housing including a body supported on the input shaft by a bearing with a body set of lands and grooves mating with the clutch plate set of lands and grooves, with a cover included as part of the housing and engaged with the body wherein the cover includes a pocket;
   a pump plate captured between the cover and the body separating out a working chamber, the pump plate including an engage port and a pump-out port positioned further radially outward in the pump plate than the engage port;
   a control arm normally closing the engage port and being rotatable to open the engage port; and
   a slide-block carried in the pocket with a spring biasing the slide block toward engagement with the control arm wherein the slide-block locks the control arm against rotation when the clutch is inactive.

2. A clutch according to claim 1 wherein the slide-block includes a notch that has a ramped surface wherein when the clutch is inactive the control arm is captured within the notch and wherein the ramped surface urges the control arm against the pump plate to securely seal the engage port.

3. A clutch according to claim 2 further comprising a thermostatic coil that rotates the control arm wherein the slide-block includes a beveled surface adjacent the notch wherein when the clutch is stopped, the control arm is movable along the beveled surface and into the notch under operation of the thermostatic coil.

4. A clutch comprising:
   an input element including an input shaft with a clutch plate engaged with the input shaft to rotate in concert therewith, the clutch plate having an annular disk portion supported on a hub, wherein the clutch plate includes a clutch plate set of lands and grooves;
   a housing including a body supported on the input shaft by a bearing with a body set of lands and grooves mating with the clutch plate set of lands and grooves;
   a cover included as part of the housing and engaged with the body, the cover including a reservoir and a pocket formed in the cover radially outward from the reservoir;
   a pump plate captured between the cover and the body separating out a working chamber generally within the body, the pump plate including a engage port and a pump-out port positioned further radially outward in the pump plate than the engage port;

a control arm normally closing the engage port and being movable to open the engage port under operation of a thermostatic coil, wherein when the engage port is closed a fluid carried in the working chamber moves radially outward under centrifugal force and is forced through the pump-out port and is pumped out of the working chamber through the pump-out port and into the reservoir in the cover, and is forced through the chamber and the channel to the reservoir, and wherein when the engage port is opened by rotation of the control arm, fluid moves from the reservoir and into the working chamber to engage the clutch; and a slide-block carried in the pocket of the cover with a spring biasing the slide-block radially inwardly, wherein when the clutch is inactive, the slide-block locks the control arm against rotation.

5. A clutch according to claim 4 wherein the slide-block includes a notch that has a ramped surface wherein when the clutch is inactive the control arm is captured within the notch and wherein the ramped surface urges the control arm against the pump plate to securely seal the engage port.

6. A clutch according to claim 5 wherein the slide-block includes a beveled surface adjacent the notch wherein when the clutch is stopped, the control arm is movable along the beveled surface and into the notch under operation of the thermostatic coil.

7. A clutch comprising:

an input element including an input shaft with a clutch plate engaged with the input shaft to rotate in concert therewith, the clutch plate having an annular disk portion supported on a hub, wherein the clutch plate includes a clutch plate set of lands and grooves;

a housing including a body supported on the input shaft by a bearing with a body set of lands and grooves mating with the clutch plate set of lands and grooves;

a cover included as part of the housing and engaged with the body, the cover including a reservoir and a pocket formed in the cover radially outward from the reservoir;

a pump plate captured between the cover and the body separating out a working chamber generally within the body, the pump plate including a engage port and a pump-out port positioned further radially outward in the pump plate than the engage port;

a control arm normally closing the engage port and being rotatable to open the engage port under operation of a thermostatic coil, wherein when the engage port is closed a fluid carried in the working chamber moves radially outward under centrifugal force and is forced through the pump-out port and is pumped out of the working chamber through the pump-out port and into the reservoir in the cover, and is forced through the chamber and the channel to the reservoir, and wherein when the engage port is opened by rotation of the control arm, fluid moves from the reservoir and into the working chamber to engage the clutch; and a slide-block including a notch and being carried in the pocket of the cover with a spring biasing the slide-block radially inwardly, wherein when the clutch is inactive, the slide-block captures the control arm within the notch and locks the control arm against rotation, and wherein when the clutch is operating and the control arm is rotated by the thermostatic coil to open the engage port and when rotation of the clutch ceases with the engage port open, the spring urges the slide-block against the control arm and wherein the slide-block includes a beveled surface that the control arm slides along under operation of the thermostatic coil so that the control arm snaps into the notch.

8. A clutch according to claim 7 wherein the slide-block includes a ramped surface in the notch wherein when the clutch is inactive the control arm is captured within the notch and wherein the ramped surface urges the control arm against the pump plate to securely seal the engage port.

* * * * *